United States Patent
Kato et al.

(10) Patent No.: US 7,227,664 B2
(45) Date of Patent: Jun. 5, 2007

(54) METHOD OF PRINTING APPLICATION DATA

(75) Inventors: Tomokazu Kato, Aichi-Ken (JP); Yoshiyuki Tamai, Itami (JP); Takatsugu Kuno, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 980 days.

(21) Appl. No.: 10/327,993

(22) Filed: Dec. 26, 2002

(65) Prior Publication Data

US 2003/0137692 A1    Jul. 24, 2003

(30) Foreign Application Priority Data

Dec. 28, 2001 (JP) .......................... P2001-401336

(51) Int. Cl.
*G06F 3/12*    (2006.01)
*G06F 15/00*    (2006.01)

(52) U.S. Cl. ..................................... 358/1.15; 358/1.13
(58) Field of Classification Search ............... 358/1.15, 358/1.14, 1.13, 1.1, 1.2, 1.6, 1.9, 1.11, 1.16, 358/1.17, 1.18, 468
See application file for complete search history.

(56) References Cited

U.S. PATENT DOCUMENTS 6,378,070 B1    4/2002 Chan et al.
6,456,388 B1 *    9/2002 Inoue et al. ............... 358/1.15
6,727,996 B1 *    4/2004 Silverbrook et al. .......... 358/1.1

FOREIGN PATENT DOCUMENTS

| JP | 09-152947 | 6/1997 |
|---|---|---|
| JP | 10-097396 | 4/1998 |
| JP | 10-235974 | 9/1998 |
| JP | 2000-035869 | 2/2000 |
| JP | 2000-132378 | 5/2000 |
| JP | 2000-267831 | 9/2000 |
| JP | 2000-330734 | 11/2000 |
| JP | 2000-353059 | 12/2000 |

* cited by examiner

*Primary Examiner*—Dov Popovici
(74) *Attorney, Agent, or Firm*—Buchanan Ingersoll & Rooney PC

(57) ABSTRACT

The present invention provides a method of printing application data. In this method, a print request and ASP certification data for accessing an application server are transmitted from a client computer to a printer of a print shop connected to the client computer and the service provider via a network capable of providing an application service, such as the Internet available for unspecified users. The printer is operable to access the application server directly according to the ASP certification data so as to receive print data from the application server and output the print data. The present invention can solve problems caused when the client computer issues a print request to the printer of the print shop via the network, so that the requirement for the client computer to acquire application software from the application server is eliminated to provide a reduced time-period of a printing operation.

12 Claims, 8 Drawing Sheets

METHOD OF PRINTING APPLICATION DATA

This application is based on application No. 2001-401336 filed in Japan, the contents of which is hereby incorporated by reference.

BACKGROUND OF THE INVENTION

1. Field of the Invention

The present invention relates to a printing system.

2. Description of the Related Art

In late years, a new service model referred to as "application service" has been increasingly popularized. In one type of application services, a client computer can acquire an application software held by an application server of an application service provider (hereinafter referred to as "ASP") accessible via a network such as the Internet, only in case of necessity, and then the acquired application software is activated and executed on the client computer.

In this type of application service, when the client computer uses a printer connected thereto via a network to print out application data which has been created using the application software acquired from the application server, the client computer has been required to re-acquire the application software so as to allow print data to be created using a printer driver associated with the client computer and then transmit the created print data to the printer via the network. That is, only for a printing operation, it has been obliged to acquire the application software from the application server and then activate the acquired software to create the print data.

The application software held by the application server on the network includes a frequently used type of business-oriented software having a small data size, such as word processing software or spreadsheet software, and various less frequently used types of management software (e.g. personnel management software, financial management software, data management software) mostly having a large data size.

Thus, even if it is intended simply to print out application data created using such large-size application software, the client computer have to spend a long time for acquiring the related application software and to bear with a resultingly extended time-period of the printing operation. In this case, the extended time-period for acquiring the application software and transmitting the print data to the printer causes an additional problem of constraining the client computer over such an extended time-period.

In addition, for each of printing operations, the application server has to transmit the related application software to the client computer and receive the application software immediately after it is returned. A resultingly increased number of transmissions/receptions causes an increased operational load in the application server. Further, a printer is generally a device having a constantly varying status. Thus, in some cases, the printer cannot carry out a print job transmitted thereto. For example, it can occur in following cases: when the printer has a member of previously ordered print jobs, the printer can accept a new print job transmitted thereto but not carry out a printing operation; the printer is in an error status; and the printer cannot accept a new print job transmitted from one client computer because it is receiving a print job from another client computer. In these cases, the printer is in the status where it cannot accept any print job. Thus, even if the application server accesses the printer via the Internet to transmit a print job, the printer can reject the receiving of the print job. This causes another problem of worthless accesses from the application server.

SUMMARY OF THE INVENTION

In view of the above technical problems, it is therefore an object of the present invention to provide a printing system capable of quickly printing out application data created using application software acquired from an application server.

In the present invention, when a client computer issues a print request for printing application data created using application software held by an application server, to a printer of a print shop available for unspecified users connected thereto via a network such as the Internet, ASP certification data for allowing the printer to directly access the application server is transmitted together with the print request. This makes it possible to provide a reduced time-period of a printing operation as compared to the conventional printing method in which the client computer acquires application software from the application server, and then transmits print data to the printer.

The present invention can also eliminate the requirement for the client computer to convert application data to print data. Thus, the client computer can be released earlier from the constraint imposed from the printing operation.

Further, since the printer is operable to directly accessing the application server, it allows the printing operation to be flexibly performed when the printer is in the printable status. Thus, worthless accesses to the application server and/or the printer can be suppressed as compared to the conventional method.

In the present invention, the ASP certification data transmitted to the printer may be deleted immediately after the completion of the printing operation. This prevents unauthorized accesses to the application server due to use of the certification data for the wrong purpose, and thereby provides enhanced security.

Further, the ASP certification data may be incorporated into a script file to be transmitted to the printer so as to provide more enhanced security.

According to the present invention, even if it is required to change a set value for printout in the printer during the printing operation, the requirement for the client computer to receive the application software and/or the application data can be eliminated. This provides more reduced time-period of the printing operation.

DESCRIPTION OF THE PREFERRED EMBODIMENT

With reference to the accompanying drawings, one embodiment of the present invention will now be described in detail.

Figure 1:
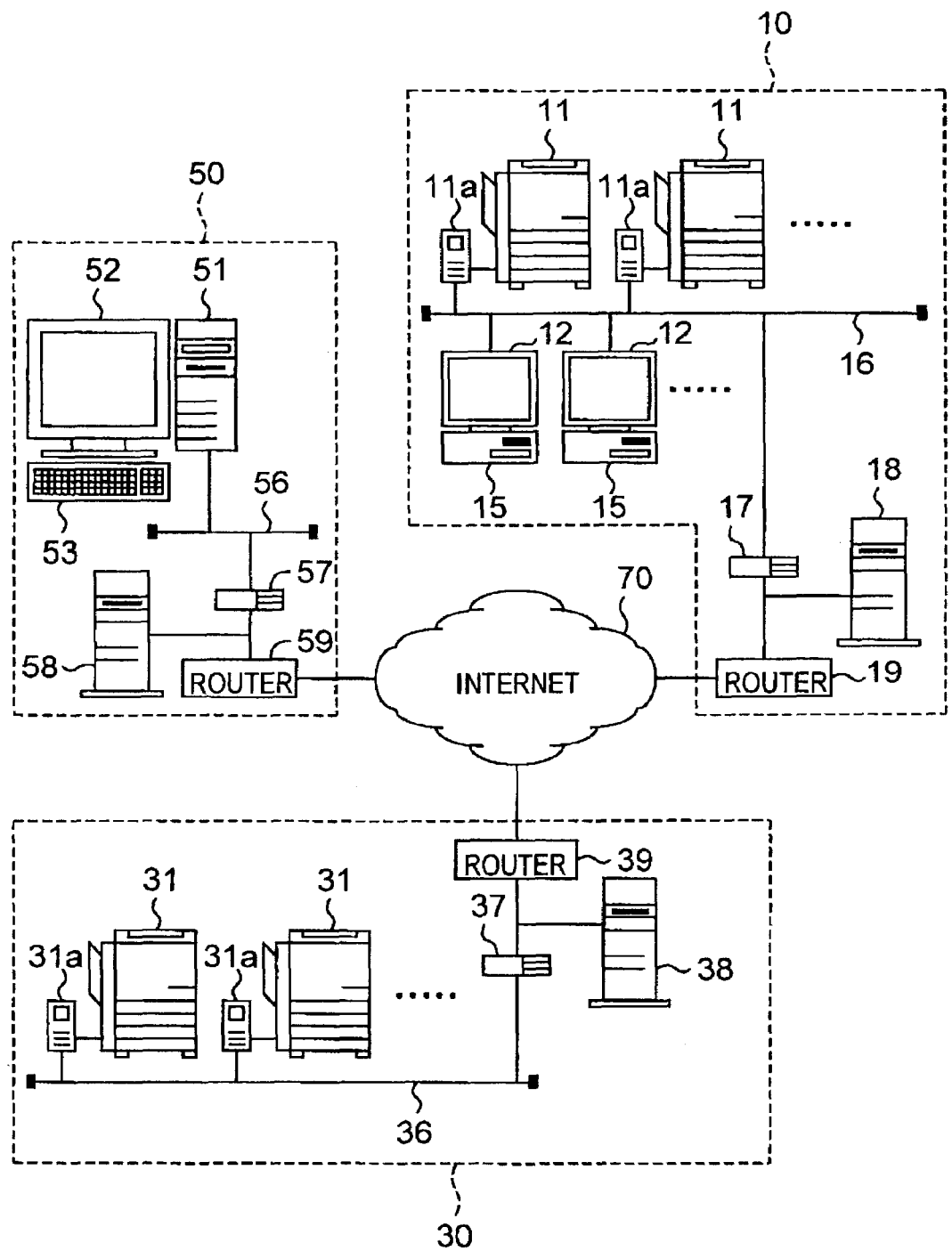
FIG. 1 is a schematic diagram showing a printing system according to one embodiment of the present invention.

FIG. 1 is a schematic block diagram showing a printing system according to one embodiment of the present invention. In this embodiment, the printing system comprises a user intranet 10 for allowing a client computer to perform various processing using application software, a print shop 30 for executing a processing for a printing operation in response to a print request from the user intranet 10, an application service provider 50 for providing application software to the user intranet 10, and the Internet 70 for interconnecting them. The user intranet 10, the print shop 30 and the application service provider 50 can communicate with each other via the Internet. The application service provider 50 is operable to transmit application software and application data to the user intranet 10.

The user intranet 10 includes plural sets of a printer 11 and a corresponding printer controller 11a. The printer controller 11a is connected to a plurality of client computers 15 via a LAN 16 to receive a print request transmitted from each of the client computers 15. The printer controller 11a is connected to the Internet 70 via the LAN 16 and through a Web server 18, a firewall 17 and a router 19 interposed in the LAN 16.

The print shop 30 includes plural sets of a printer 31 and a corresponding printer controller 31a. The printer controller 31a is connected to the client computers 15 of the user intranet 10 via the Internet 70 to receive a print request transmitted from each of the client computers 15. The printer controller 31a is connected to the Internet 70 via a LAN 36 and through a Web server 38, a firewall 37 and a router 39 interposed in the LAN 36, so as to access the application service provider 50 via the Internet 70. The printer controller 31a is also operable to receive print data from the application service provider 50 and transfer the received print data to the corresponding printer 31 to perform the printing operation. The Web server 38 is operable to accept an access request from each of the client computer 15 to the printer controller 31a.

Each of the firewalls 17, 37 has a packet filtering function, a proxy function and others. Thus, only a packet having data, such as a mail source IP address (host name), a destination IP address (host name), a transmitter port code or a designation port code, capable of meeting given requirements is allowed to pass through each of the firewalls 17, 37. That is, only a given packet can be transmitted from the Internet 70 to the printer controller 31a. Further, when the printer 11 of the user intranet 10 accesses an application server 51 provided in the application service provider 50, if the responder and designation of a response to the access are respectively the application server 51 and the printer 11, the firewall 17 allows the response to pass therethrough. During this operating, the router 19 performs a routing control.

The application server 51 of the application service provider 50 is connected to the Internet 70 via a LAN 56 and through a firewall 57 and a router 59 interposed in the LAN 56 to communicate with the client computers 15, the printer controllers 11a of the user intranet 10 and the printer controllers 31a of the print shop 30. The application service provider 50 further includes a Web server 58 for accepting an access request from each of the client computers 15 to the application server 51 and an access request from each of the printer controllers 11a, 31a to the application server 51.

Figure 2:
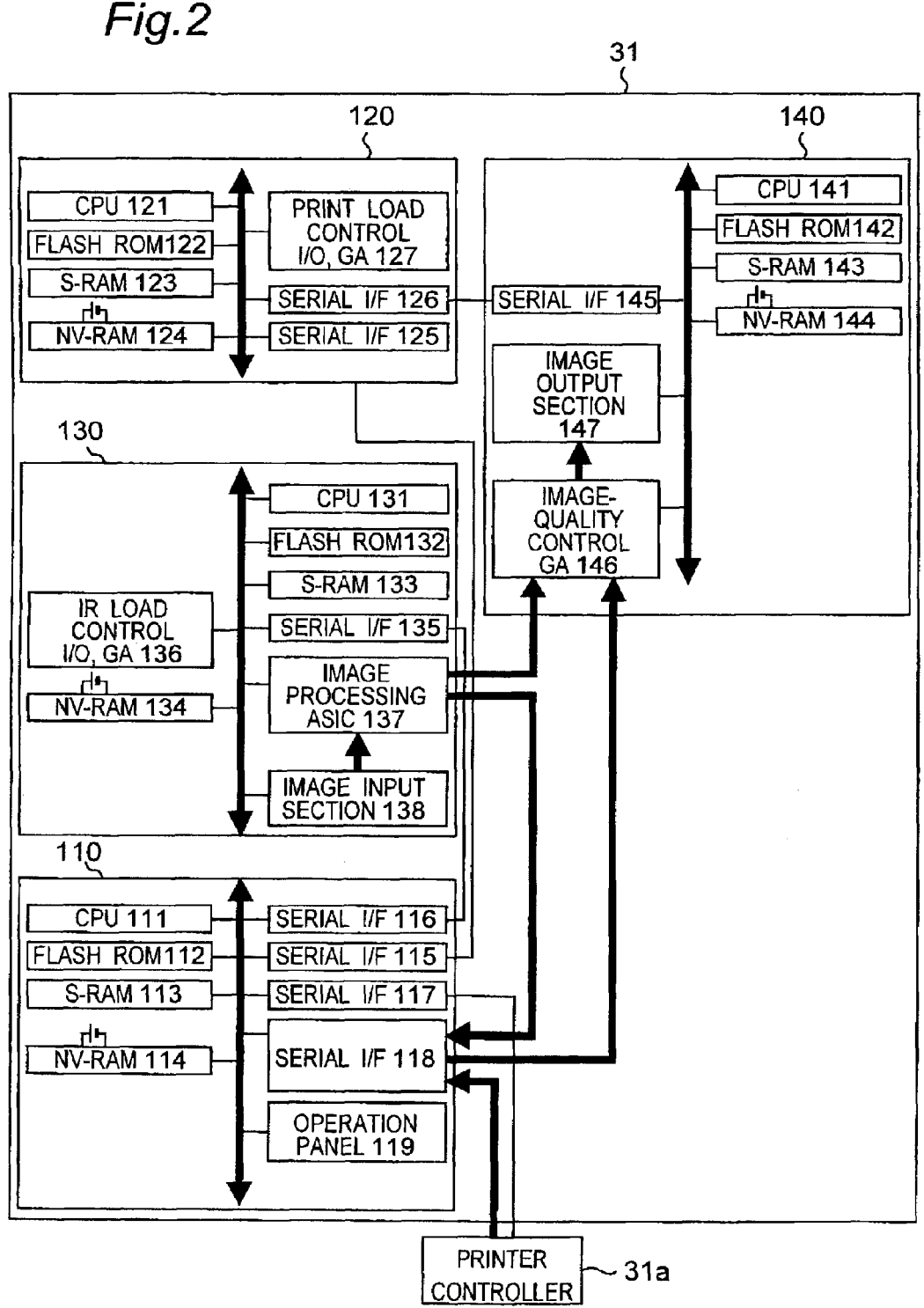
FIG. 2 is a block diagram showing a printer of a print shop in the printing system.

FIG. 2 shows a block diagram of the circuitry of the printer 31 of the print shop 30. The printer 31 is controlled by multi CPUs composed of first to fourth control modules 110, 120, 130, 140 corresponding to the respective CPUs. The term "module" herein means a functional block including a CPU or a control circuit with a CPU and performing control functions.

The first control module 110 comprises a CPU 111 for transmitting control instructions and control data to the second to fourth control modules 120, 130, 140 to govern the entire control of the printer 31, a rewritable flash ROM (nonvolatile memory) 112 storing firmware for the CPU 111, a S-RAM 113 serving as a work area, a battery-backuped NV-RAM (nonvolatile memory) 114 storing various set values, a first serial interface (hereinafter referred to as "I/F") 115 for transmitting/receiving various control data to/from the second control module 120, a second serial I/F 116 for transmitting/receiving various control data to/from the third control module 130, a third serial I/F 117 for transmitting/receiving various control data to/from the printer controller 31a, and an operation panel 119. The first control module 110 further includes a first video I/F 118 for receiving image data of a print job from the printer controller 31a of the print shop 30, receiving read image data from the third control module 130, and transmitting to the fourth control module 140 the read image data received from the third control module 130.

The second control module 120 comprises a CPU 121 for performing a print control such as a driving control for various drive loads of the printer 31 of the print shop 30, a rewritable flash ROM (nonvolatile memory) 122 storing firmware for the CPU 121, a S-RAM 123 serving as a work area, a battery-backuped NV-RAM 124 storing various set values, a fourth serial I/F 125 for transmitting/receiving various control data to/from the first control module 110, a fifth serial I/F 126 for transmitting/receiving various control data to/from the fourth control module 140, and a print-load control I/O, GA 127 serving as a driving control circuit for various drive loads such as a motor heater switch in the printer 31 of the print shop 30.

The third control module 130 comprises a CPU 131 for performing a document scanning control and an image processing control for the printer 31 of the print shop 30, a rewritable flash ROM (nonvolatile memory) 132 storing firmware for the CPU 131, a S-RAM 133 serving as a work area, an image input section 138 for receiving therein image data photoelectrically converted by controllably driving a CCD or the like, an image processing ASIC 137 for outputting to the first or forth control module 110, 140 image data obtained by subjecting the image data from the image input section to various image processing such as a digital processing including shading correction, reflectivity-density conversion, MTF correction, density correction, and error spreading, a battery-backuped NV-RAM 134 storing various set values, a sixth serial I/F 135 for transmitting/receiving various control data to/from the first control module 110, and a IR-load control I/O, GA 136 serving as a driving control circuit for various drive loads such as a scanning motor and a scanning lamp of an image read device (IR).

The fourth control module 140 comprises a CPU 141 for performing an image correction control and an image output control for the printer 31 of the print shop 30, a rewritable flash ROM 142 storing firmware for the CPU 141, a S-RAM 143 serving as a work area, an image-quality correction control GA 146 for performing an image quality control such as smoothing, halftone reproduction, and image quality correction, an image output section 147 for controllably driving an LD or the like in response to the output image data from the image-quality correction control GA 146 to output an image, a battery-backuped NV-RAM 144 storing various set values, a seventh serial I/F 145 for transmitting/receiving various control data to/from the second control module 120.

Figure 3:
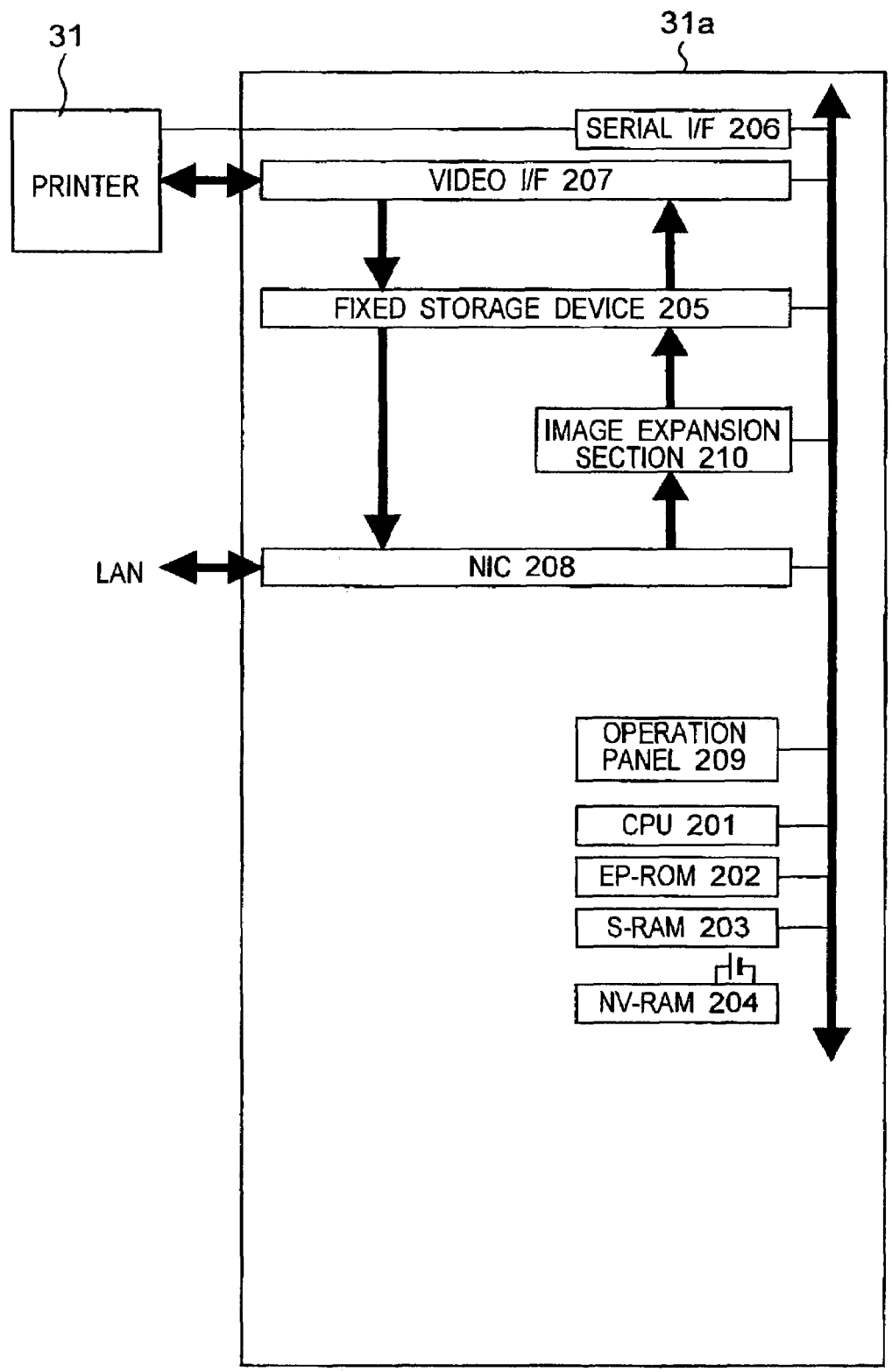
FIG. 3 is a block diagram showing a printer controller associated with the printer.

FIG. 3 shows a block diagram of the circuitry of each of the print controllers 31a of the print shop 30. Each of the print controllers 11a of the user intranet 10 has the same configuration as that of the print controller 31a, and their detailed description will be omitted.

The print controller 31a comprises: a CPU 201 for performing a job management, a firmware management, a print image processing control, a data conversion of image data received from e-mail or image data to be transmitted via e-mail, a transmit/receive control of an e-mail accompanied by image data, and a rewriting control of firmware; an EP-ROM (nonvolatile memory) 202 storing a control program for executing the above processing of the CPU 201; an NIC (network interface card) 208 for transmitting and receiving various data, such as image data to be transmitted to another printer and a print job to be received, to/from the LAN 36; a fixed storage device, that is hard disk drive (nonvolatile memory) 205 such as a hard disk for storage the received print job and the image data transmission job; an image expansion section 210 including an interpreter for converting print data of the received print job described by PDL (page-description language) into intermediate codes, a font storage section storing font data and associated data for analyzing the intermediate codes, a RAM for storing bitmap data, and a plotting processing section for introducing bitmap data expanded from the intermediate codes into the RAM; a S-RAM 203 serving as a work area; and a battery-backuped NV-RAM 204 storing various set values and management data.

The NV-RAM 204 is operable to store a mail address (URL) and a password of the application server 51 in addition to an IP address of the printer controller 31a itself.

The printer controller 31a further includes an eighth serial I/F and a second video I/F 207 which are connected, respectively, to the third serial I/F 117 and the first video I/F 118 of the printer 31, and an operation panel 209 for adjusting various set values.

Figure 4A:
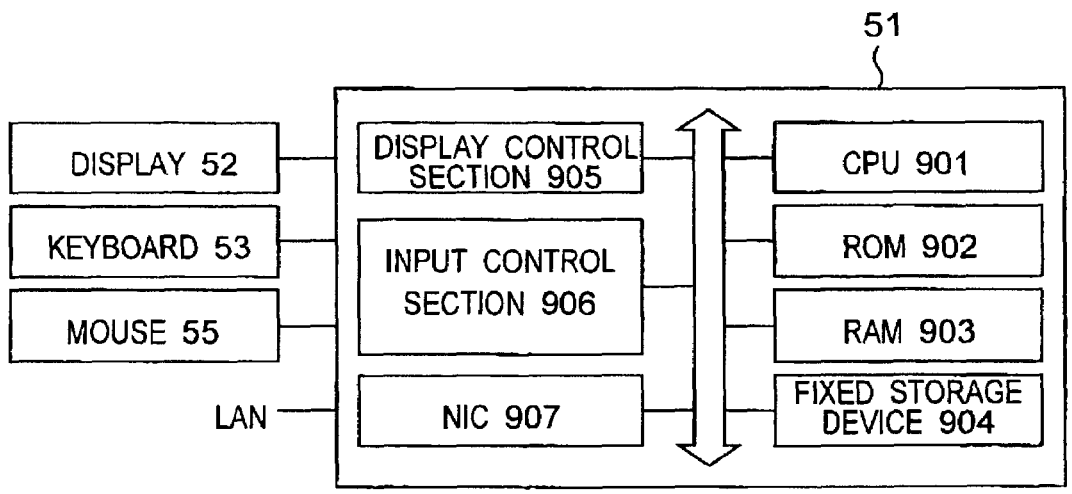
FIG. 4A is a block diagram showing an application server in the printing system.

FIG. 4A shows a block diagram of the circuitry of the application server 51 provided in the application service provider 50. The application server 51 mounts a CPU 901, a first ROM 902, a second ROM 903, and a fixed storage device 904. The application server 51 is connected with a display 52 through a display control section 905 and with a keyboard 53 and a mouse 55 through an input control section 906. Further, the application server 51 includes a built-in NIC 907 for transmitting and receiving various data via the LAN 56.

The fixed storage device 904 stores registered data of each of the client computers 15 such as certification data required for each of the client computers 15 to access the application server 51, each e-mail address of the client computers 15, respective file names of application software and application data to be delivered, each address of the printers 31 to be used by the client computers, each product name of the printers 31, and each name of printer drivers associated with the printers 31. The fixed storage device 904 further stores application software and application data to be delivered to each of the client computers 15, and different print drivers provided for each of the client computers 15 and adapted to be activated in response to respective print requests from the corresponding client computers.

Each of the print drivers is operable to create print job data composed of job control data, page control data, and print image data described by page-description language. The job control data includes a job identifier, a job name, a job transmitter name, the number of copies required for each job, and a job-processing mode (e.g. a high-priority job mode, low-priority job mode, job combination mode or job separation mode to be set in each job), to control the corresponding printer with respect to each job identified thereby. The page control data includes a document identifier, a document name, the numbers of sides to be printed, a paper size, a selected paper feed tray, and a paper discharge mode, to control the corresponding printer according to specific conditions for printing the print image data on a paper. The print image data described by page-description language is obtained by converting application data created using application program or application software into interpretable data for the printer controller 31a, i.e. print data. When the printer driver is activated, a given operation screen is displayed on a display 12 associated with the client computer 15. By using the operation screen, the client computer 15 can transmit a print request to the printer driver via the Internet. In response to the receiving of the print request, the print driver creates job control data and page control data, and converts application data into print image data described by PDL. Further, the print driver transmits a print job request and the created print job data to the printer 31 designated by the client computer 15. Then, the designated printer 31 prints the print image data or print data according to the received job control data and page control data.

Figure 4B:
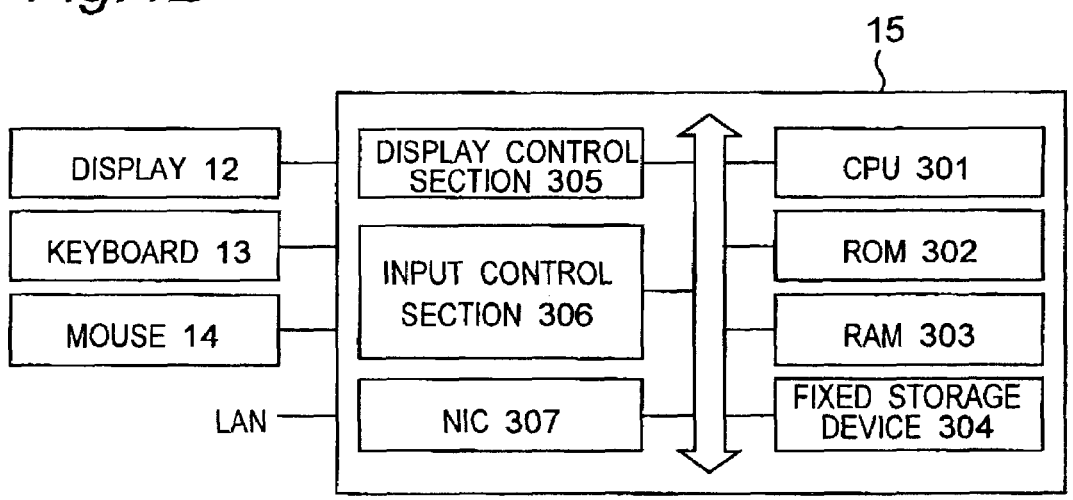
FIG. 4B is a block diagram showing a client computer in the printing system.

FIG. 4B shows a block diagram of the circuitry of each of the client computer 15. The client computer 15 mounts a CPU 301, a first ROM 302, a second ROM 303, and a fixed storage device 304. The client computer 15 is connected with a display 12 through a display control section 305 and with a keyboard 13 and a mouse 14 through an input control section 306. Further, the client computer 15 includes a built-in NIC 307 for transmitting and receiving various data via the LAN 16. The first ROM 302 and the fixed storage device 304 of the client computer 15 stores a program for accessing the application server 51 by using certification data, a program for acquiring application software and application date created using the application software from the application server 51, and a program for requesting the creation of print data to the application server 51 and the access to the printer 31 or the application server 51. The CPC 301 executes the programs to control various processing.

Figure 6:
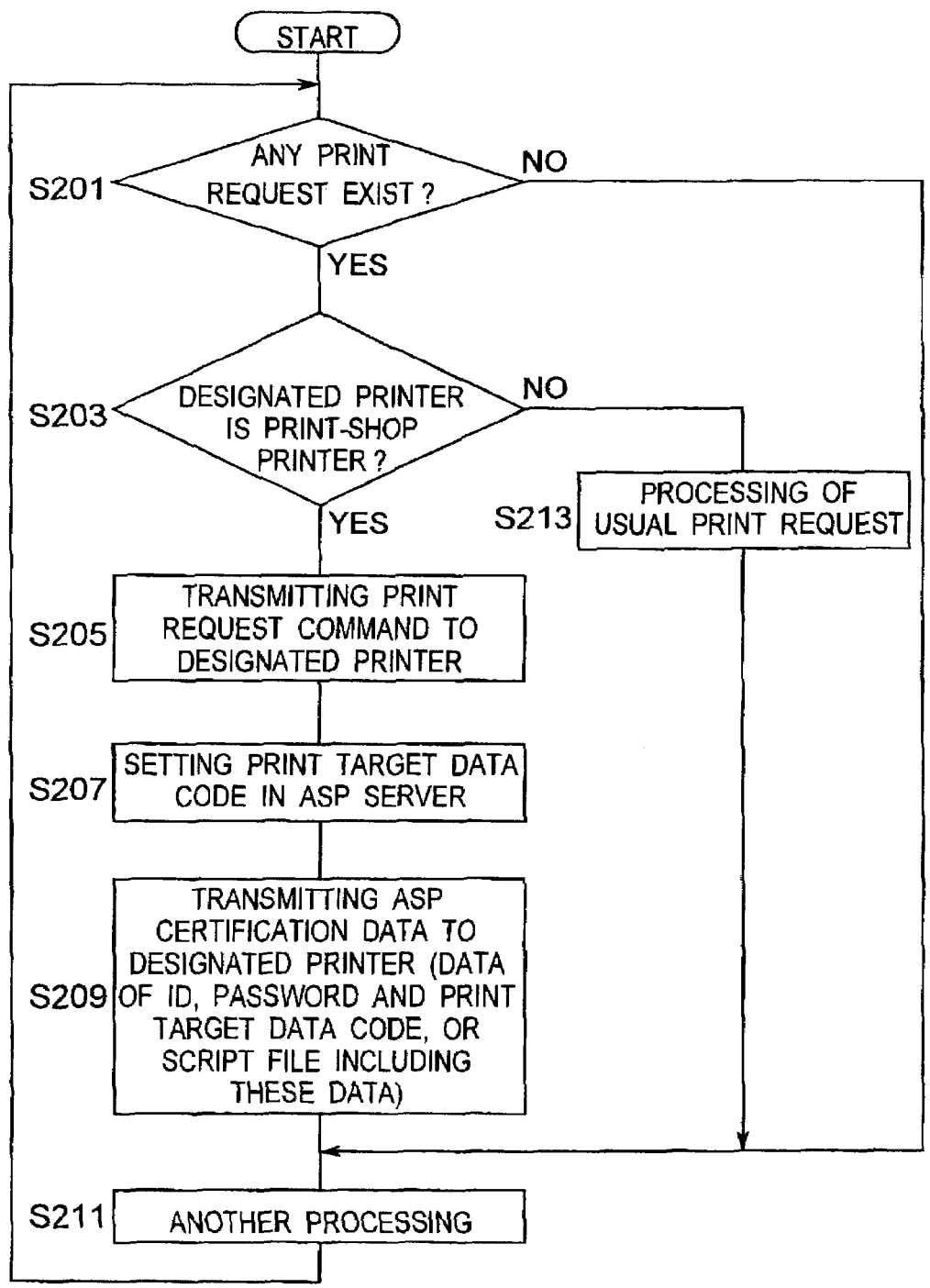
FIG. 6 is a flowchart of a processing for issuing a print request in the client computer.

The operation of the printing system constructed as above will be described below. FIG. 6 shows an operational flowchart for issuing a print request in the client computer 15.

At Step S201, it is determined if a print request exists. If "YES", the process advances to Step S203. If "NO", the process skips to Step S211.

At Step S203, it is determined if a printer designated by the print request identified at Step S201 is the printer 31 provided in the print shop 30 connected via the Internet 70. If "YES", the process advances to Step S205. If "NO", the process advances to Step S213.

A print request command is transmitted to the designated printer 31 at Step S205, and then the process shifts to Step S207.

At Step S207, the client computer sets a print target data code (a code of desired application data to be printed) for the application server 51. Then, the process shifts to Step S209.

At Step S209, certification data for accessing application software (hereinafter referred to as "ASP Appl") held by the application server 51 is transmitted to the designated printer 31. The certification data to be transmitted (hereinafter referred to as "ASP certification data") is composed of an ID and a password for accessing the ASP Appl, the print target data code set at Step S207.

Instead of transmitting the ID and password for accessing the ASP Appl and the print target data code directly to the designated printer 31 at Step S209, a script file containing these ASP certification data (hereinafter referred to as "ASP access script file") may be transmitted.

After the completion of the above processing, the process shifts to Step S211 to perform another processing.

On the other hand, a processing for a print request issued to the local printer 11 of the user intranet is executed at Step S213. After the completion of the processing, the process shifts to Step S211.

Figure 5:
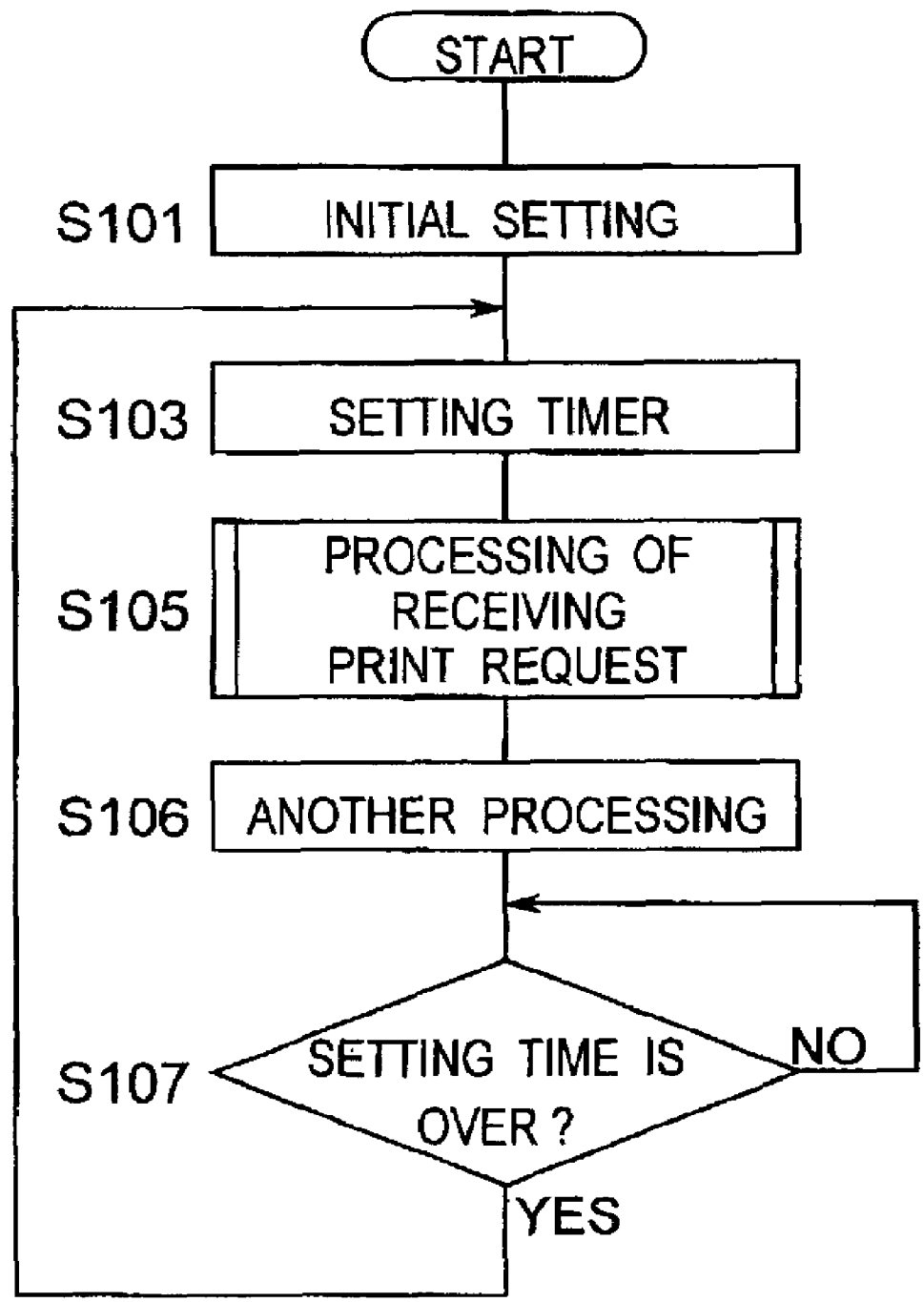
FIG. 5 is a flowchart of a main processing in the printer.

At the same time, a processing as shown by a flowchart in FIG. 5 is performed in the printer 31 provided in the print shop 30.

At Step S101, an initial setting such as a processing for checking hardware and/or firmware of the printer 31 is executed. Then, the process shifts to Step S103.

After activating a timer at Step S103, the process shifts to Step S105. The timer is used to determine the timeout of one cycle of the printing operation.

At Step S105, a processing for receiving the print request from the client computer 15 is executed. This print-request receiving processing at Step S105 will be described in detail later with reference to FIG. 7. Another processing is executed at Step S106, and then the process advances to Step S107. At Step S107, it is determined if a set period of the timer is over. If "YES", the process returns to Step S103. If "NO", it is repeated to determine if the set period of the timer is over.

Figure 7:
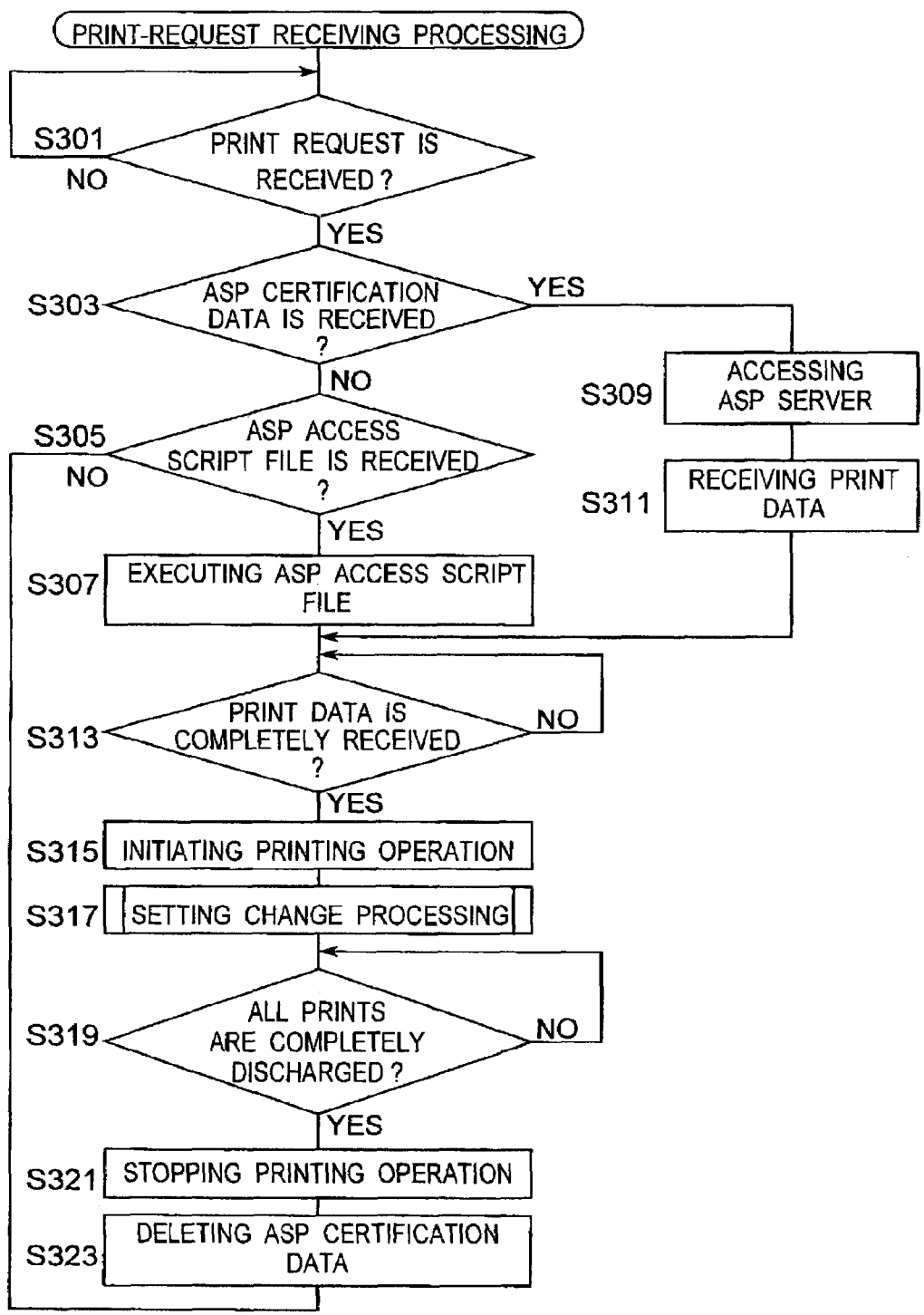
FIG. 7 is a flowchart of a processing for receiving the print request in the printer.

FIG. 7 is a flowchart of the print-request receiving processing at Step S105 in FIG. 5. At Step S301, it is first determined if a print request from the client computer exists. If "YES", the process shifts to Step S303. If "NO", the process returns to Step S301.

At Step S303, it is determined if ASP certification data is received from the client computer in conjunction with the print request at Step S301. If "YES", the process shifts to Step S309. If "NO", the process shifts to Step S305.

At Step S305, it is determined if an ASP access script file is received. If "YES", the process shifts to Step S307. If "NO", the process returns to Step S313.

At Step S307, the ASP access script file received at Step S305 is executed. The ASP access script file is an execution module transmitted from the client computer to the designated printer 31 of the print shop 30 together with the print request. The ASP access script file contains the ID and password for accessing the ASP Appl and the target data code as described above, and executes a set of procedures of logging in the application server by use of the ID and the password, opening the desired application data according to the print target data code to create print data, and receiving the created print data. Then, the process shifts to Step S 313.

On the other hand, at Step S309, the printer 31 accesses the application server according to the ASP certification data received at Step S303. More specifically, the printer 31 executes a set of procedures of logging in the application server by use of the ID and the password, opening the desired application data according to the print target data code, and creating print data. Then, the process shifts to Step S311.

At Step S311, the printer 31 receives the print data created at Step S309. Then, the process shifts to Step S313.

At Step S313, it is determined if the print data is completely received. If "YES", the process shifts to Step S315. If "NO", the process returns to Step S313.

At Step S315, a print operation is initiated according to the received print data determined at Step S313. Then, the process shifts to Step S317.

At Step S317, a processing for changing the set values such as image position is executed if such a need is caused during the printing operation. The set-value changing processing at Step S317 will be described in detail later with reference to FIG. 8.

After the completion of the processing at Step S317, the process shifts to Step S319.

At Step S319, it is determined if a printed martial having the entire received print data thereon is discharged. If "YES", the process shifts to Step S321. If "NO", the process returns to Step S319.

At Step S321, the printing operation of the printer 31 is stopped according to the determination at Step S319. Then, the process shifts to Step S323.

At Step S323, upon the substantial completion of the printing operation, the ASP certification data including important security data to the ASP server is deleted to prevent its use for the wrong purpose, and then the print-request receiving processing is completed.

Figure 8:
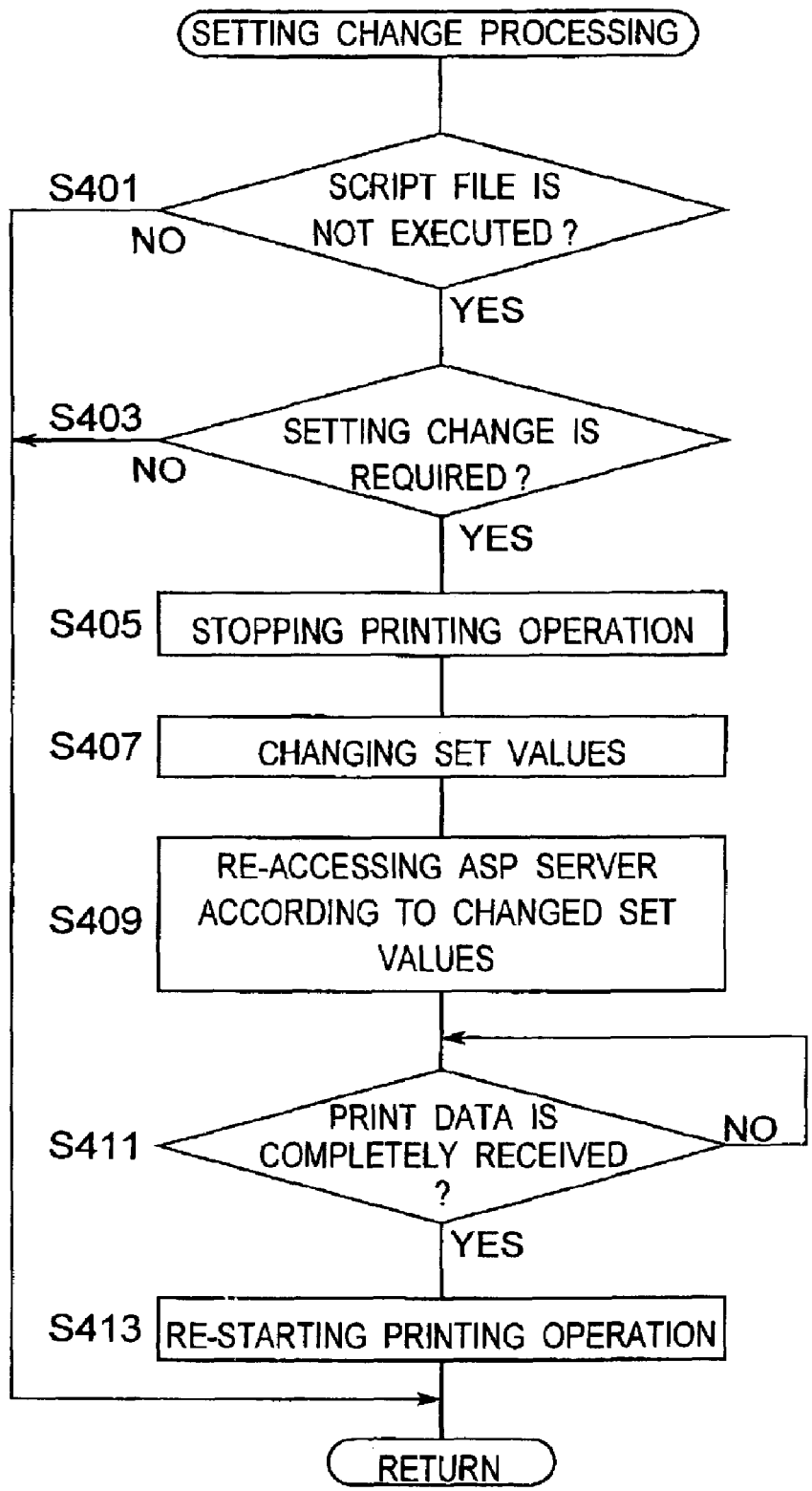
FIG. 8 is a flowchart of a processing for changing a set value for printout in the printer during a printing operation.

FIG. 8 is a flowchart of the set-value changing processing at Step S317 in FIG. 7.

At Step S401, it is determined if the ASP access script file is not executed in the print-request receiving processing. If "YES", the process shifts to Step S403. If "NO", the process is completed.

At Step S403, a user determines if it is necessary to change the set values such as image position during the printing operation through the ASP server. If "YES", the process shifts to Step S405. If "NO", the process is completed.

At Step S405, the printing operation of the printer 31 is stopped according to the determination of Step S403. Then, the process shifts to Step S407 for allowing the user to change the set values.

After the completion of the set-value changing processing at Step S407, the process shifts to Step S409. At Step S409, the printer 31 re-accesses the ASP server according to the set values changed at Step S407 to receive print data.

At Step S411, it is determined if the print data is completely received. If "YES", the process shifts to Step S413. If "NO", the process returns to Step S411.

At Step S413, the printing operation of the printer 31 is restated according to the determination at Step S411.

As described above, in the printing system of the present invention, the client computer instructs the printer of the print shop to perform the printing operation according to the above procedural flows.

It is to be understood that the present invention is not limited to the illustrated embodiment, but various modifications and alterations can be made without departing from the spirit and scope of the present invention.

What is claimed is:

1. A method of printing application data in a printing system including a client computer, an application server holding application software to be provided to said client computer, and a printer operable to output print data in response to a print request from said client computer, wherein said client computer, application server and printer are connected with each other via a network, said method comprising:

a first step of allowing said client computer to accept a print request concerning the application data created using said application software;

a second step of transmitting a first data set from said client computer to said printer, and transmitting a second data set from said client computer to said application server, said first data set including data for designating the application server, certification data for accessing said application server, data for designating said application data, and a request for printing said application data, said second data set including certification data for accessing said application server, data for designating said application data, and a request for creating the print data according to said application data;

a third step of allowing said printer to access said application server by use of said certification data;

a fourth step of allowing said printer to acquire the print data created according to said application data from said application server; and a fifth step of allowing said printer to print out said print data.

2. The method as defined in claim 1, wherein said first step includes a step of transmitting a script file from said client computer to said application server, said script file containing control instructions for activating the application software and transmitting the print data to be executed in said application server.

3. The method as defined in claim 1, wherein said first step includes a step of transmitting a script file from said client computer to said printer, said script file containing certification data for accessing said application server, and control instructions for accessing said application server by use of said certification data and receiving the print data to be executed in said printer.

4. The method as defined in claim 1, wherein said certification data for accessing said application server is deleted after accessing said application server.

5. The method as defined in claim 1, further comprising:

a step of allowing said printer to receive an instruction data containing at least a request for changing set-values for printout;

a step of allowing said printer to access again said application server in response to transmitting said instruction data containing a request for changing set-values for printout, and acquire again a print data based on setting after change.

6. The method as defined in claim 1, wherein said first step further includes a step of transmitting a printer driver for creating said print data according to said application data from said client computer to said application server.

7. The method as defined in claim 1, wherein said first step further includes a step of determining if the application software which created an application data as target of print request exists in said application server, wherein said steps after said first step are executed when it is determined that said application software exists in said application server.

8. The method as defined in claim 1, wherein said second step further includes a step of instruct said client computer to transmit a request to said application server for creating said print data from application data.

9. A method of allowing a client computer to issue an instruction for printing application data, said client computer operable to create the application data using application software acquired from an application server connected thereto via a network, said method comprising steps of:

accepting a print request concerning the application data created using said application software; and transmitting a first data set to a printer connected to said client computer and said application server via a network, and transmitting a second data set to said application server, said first data set including data for designating said application server, certification data for accessing said application server, and a request for printing said application data, said second data set including certification data for accessing said application server, data for designating said application data, and a request for creating print data according to said application data.

10. The method as defined in claim 9, wherein said first step further includes a step of transmitting a printer driver for creating said print data according to said application data from said client computer to said application server.

11. The method as defined in claim 9, wherein said first step further includes a step of determining if the application software which created an application data as target of print request exists in said application server, wherein said steps after said first step are executed when it is determined that said application software exists in said application server.

12. A method of allowing a printer to print application data, said method comprising steps of:

receiving data from a client computer connected to said printer via a network, said data including data for designating an application server connected to said printer and said client computer via a network, certification data for accessing said application server, data for designating the application data, and a request for printing said application data;

accessing said application server by use of said certification data;

acquiring print data created according to said application data from said application server; printing out said acquired print data;

a step of allowing said printer to receive an instruction data containing at least a request for changing set-values for printout; and a step of allowing said printer to access again said application server in response to transmitting said instruction data containing a request for changing set-values for printout, and acquire again a print data based on setting after change.

* * * * *